(12) United States Patent
Hasegawa (10) Patent No.: US 7,077,233 B2
(45) Date of Patent: Jul. 18, 2006

(54) LAYOUT STRUCTURE OF POWER STEERING SYSTEM FOR VEHICLE

(75) Inventor: Yosuke Hasegawa, Saitama (JP)

(73) Assignee: Honda Motor Co., LTD, Tokyo (JP)

( * ) Notice: Subject to any disclaimer, the term of this patent is extended or adjusted under 35 U.S.C. 154(b) by 37 days.

(21) Appl. No.: 10/947,206

(22) Filed: Sep. 23, 2004

(65) Prior Publication Data

US 2005/0077100 A1 Apr. 14, 2005

(30) Foreign Application Priority Data

Sep. 30, 2003 (JP) ............................. 2003-339849

(51) Int. Cl.
*B62D 5/06* (2006.01)
(52) U.S. Cl. ................. 180/426; 180/439; 180/908
(58) Field of Classification Search ................ 180/426, 180/439, 440, 908; 280/93.502, 93.51, 93.513, 280/771, 779
See application file for complete search history.

(56) References Cited

U.S. PATENT DOCUMENTS 5,076,383 A * 12/1991 Inoue et al. ................ 180/417

FOREIGN PATENT DOCUMENTS

JP 2617208 B2 3/1997

* cited by examiner

*Primary Examiner*—Lesley D. Morris
*Assistant Examiner*—Marc A. Scharich
(74) *Attorney, Agent, or Firm*—Birch, Stewart, Kolasch & Birch, LLP (57) ABSTRACT

The degrees of freedom in the design of a layout structure of a power steering system for a vehicle are increased so that the auxiliary parts can be arranged around the power assisting actuator without the need for a special increase in the strength and in the stiffness of a body frame for installing the power steering system. The front wheels are steered by a power steering system supported by the body frame wherein the power steering system is provided with an actuator for assisting a steering force. One end of the actuator is installed to a first cross pipe laid over the left and right portions of the body frame. The arrangement is such so that a longitudinal direction of the actuator runs substantially in parallel with a center line of a chassis extending in a back-and-forth direction of the vehicle body.

20 Claims, 11 Drawing Sheets

LAYOUT STRUCTURE OF POWER STEERING SYSTEM FOR VEHICLE

CROSS-REFERENCE TO RELATED APPLICATIONS

The present application claims priority under 35 USC 119 to Japanese Patent Application No. 2003-339849 filed on Sep. 30, 2003 the entire contents of which are hereby incorporated by reference.

BACKGROUND OF THE INVENTION

1. Field of the Invention

The present invention relates to layout structure of a power steering system for a vehicle, and more particularly to layout structure of an actuator.

2. Description of Background Art

A conventional layout structure of a power steering system for a vehicle is known wherein the power steering system is arranged in a front part of a body frame by coupling the front end of an actuator for constituting the power steering system to a steering shaft and installing the rear end of the actuator to a component part of the body frame. See, for example, Japanese Patent Laid-Open No. 2617208, FIGS. 1 and 3.

Figure 10:
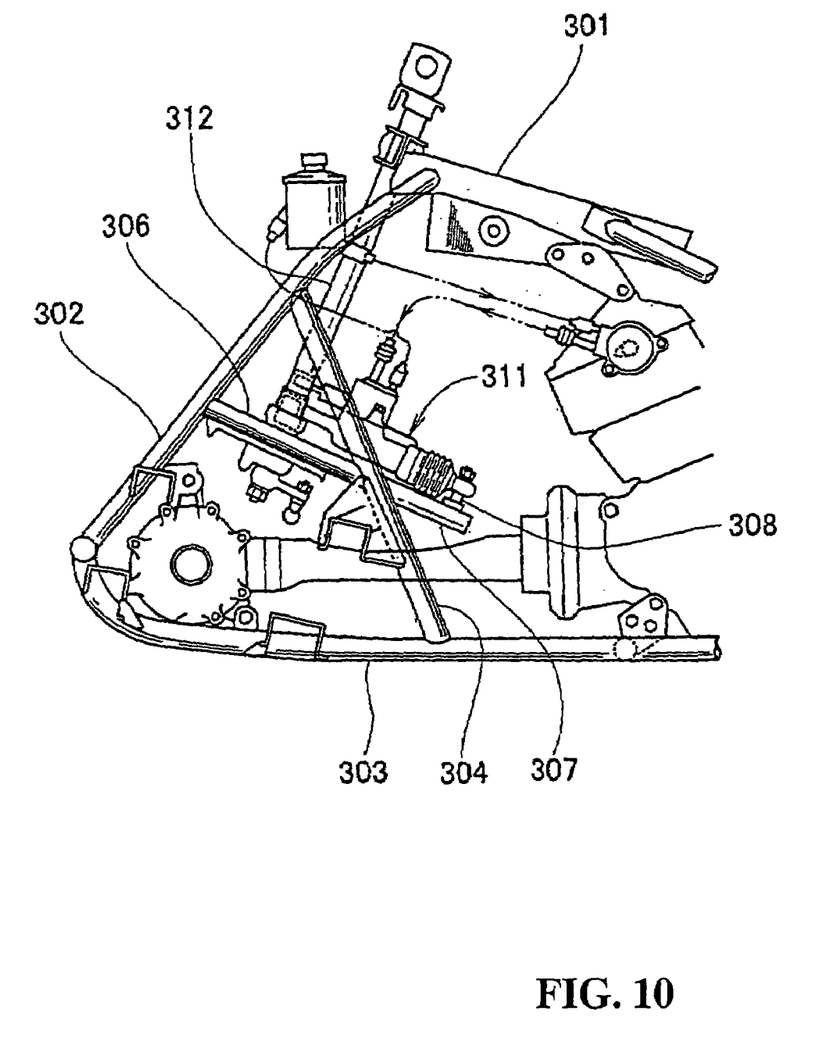
FIG. 10 is a side view of the principal part showing conventional layout structure of the power steering system for the vehicle.

FIG. 10 of the drawings corresponds to FIG. 3 of Japanese Patent Laid-Open No. 2617208. The reference numerals in FIG. 10 have been re-designated as compared to FIG. 3 of Japanese Patent Laid-Open No. 2617208.

FIG. 10 is a side view of principal part showing a conventional layout structure of a power steering system for a vehicle wherein the body frame is provided with: a main pipe 301 provided in the upper part; a front pipe 302 extending forward and obliquely downwardly from the front end portion of this main pipe 301 and an under pipe 303 which is curved downwardly from the lower end of this front pipe 302 and extends backwardly. A front cushion pipe 304 is laid between the front pipe 302 and under pipe 303 and a hold pipe 306 under the steering is laid between the front pipe 302 and front cushion pipe 304. The rear end of a power assisting actuator 311 is provided for constituting the power steering system and is installed to a pipe end 307 extending from the hold pipe 306 under the steering via a vertical shaft 308 and the front end of the power assisting actuator 311 is coupled to the steering shaft 312.

When the power assisting actuator 311 is operated and an assisting force is applied to the steering shaft 312, a reaction force is generated in the power assisting actuator 311 itself. Therefore, the pipe end 307 requires strength and stiffness for supporting the above-described reaction force. However, if the pipe end 307 is shaped like a cantilever beam, for example, the sectional shape must be taken into consideration. Thus, the sectional area is made larger and a reinforcement must be made in order to prevent its deflection from becoming great, resulting in an increase in cost.

Further, when the power assisting actuator 311 is shaped like a cylinder, the way the longitudinal direction having a long and narrow shape is arranged in the body frame will affect the degrees of freedom in design such as the shape and size of the auxiliary parts to be installed around it.

Figure 11:
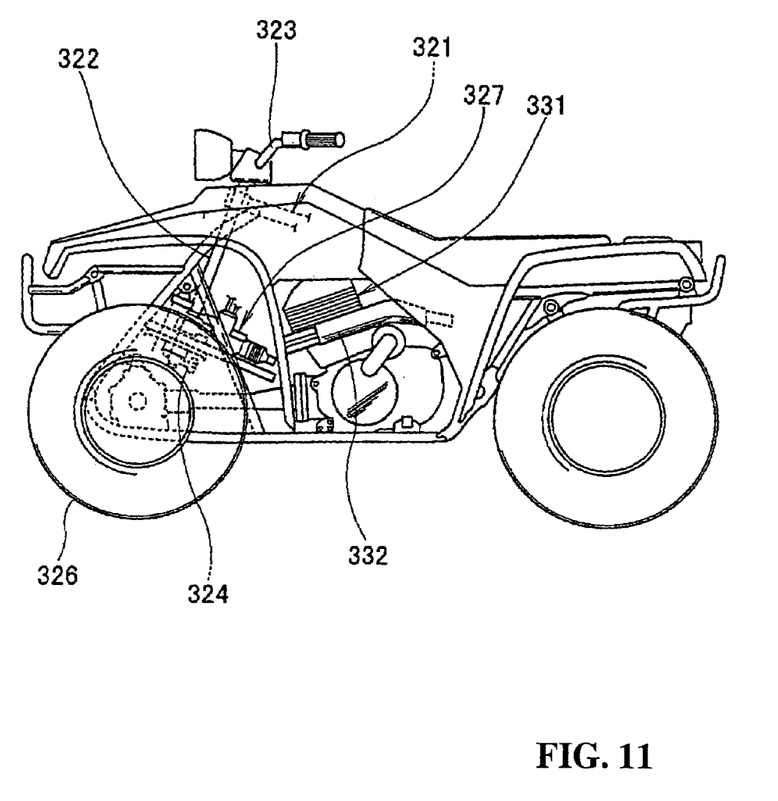
FIG. 11 is a side view showing a vehicle equipped with a conventional power steering system.

FIG. 11 of the drawings corresponds to FIG. 1 of Japanese Patent Laid-Open No. 2617208. The reference numerals for FIG. 11 have been re-designated as compared to FIG. 1 of Japanese Patent Laid-Open No. 2617208.

FIG. 11 is a side view showing a vehicle equipped with a conventional power steering system wherein the steering shaft 322 is installed on the body frame 321 of the vehicle. On the upper end of the steering shaft 322, handlebars 323 are installed and to the lower end thereof, the steering arm 324 is installed. A knuckle arm is coupled to the steering arm 324 via a tie rod with the front wheel 326 being supported by this knuckle arm. To the lower part of the steering shaft 322 a hydraulic power assisting actuator 327 is coupled for constituting one portion of the power steering system. In FIG. 11, an engine 331 is arranged in the rear of the power assisting actuator 327 and installed to the body frame 321. An exhaust pipe 332 extends from the front part of the engine 331 towards the rear of the vehicle body.

The power assisting actuator 327 is connected to hydraulic piping extending from, for example, an oil pump and a reservoir tank. Thus, when the hydraulic piping and the above-described exhaust pipe approach to each other, heat countermeasures such as providing the hydraulic piping with a heat insulator becomes necessary so as not to be affected by heat from the exhaust pipe. If such heat countermeasures are taken, the space around the power assisting actuator 327 will be narrowed and the degrees of freedom in design of the power steering system such as the power assisting actuator and the hydraulic piping, the exhaust piping and the engine will be reduced.

SUMMARY AND OBJECTS OF THE INVENTION

It is a problem of the present invention to increase, in the layout structure of a power steering system for a vehicle, the degrees of freedom in design of the auxiliary parts, the power steering system, the engine, the exhaust pipe and the like which are to be arranged around the power assisting actuator, without the need for any special increase in strength and in stiffness in a body frame to which the power steering system is installed.

According to the present invention, there is provided a vehicle in which front wheels are installed on the body frame side in such a manner as to be freely steered and are steered by a steering system having the power steering system supported by the body frame. The power steering system is provided with an actuator for assisting a steering force, one end of this actuator is installed to a cross pipe laid over the left and right of the body frame. An arrangement is provided so that the longitudinal direction of the actuator becomes substantially parallel with the center line of the chassis extending in the back-and-forth direction of the vehicle body.

One end of the actuator is installed to the cross pipe and a reaction force that is generated in the actuator is supported by the cross pipe. The stiffness of the actuator has been enhanced by installing both ends thereof to a component part of the body frame.

If the longitudinal direction of the actuator is arranged so as to become substantially parallel with the center line of chassis, an effectively usable and large space will be obtained between a main component part of the body frame extending in the substantially back-and-forth direction and the actuator.

The present invention provides an actuator, the hydraulic piping for the actuator and the oil pump for the actuator that are provided at a side opposite to a side on which the exhaust pipe extends from the front part of the engine with respect to the center line of the chassis extending in the back-and-forth direction of the vehicle body.

The actuator of the power steering system, the hydraulic piping for the actuator and the oil pump for the actuator are provided at a side opposite to a side on which the exhaust pipe extends with respect to the center line of chassis. The actuator, the hydraulic piping and the oil pump are kept apart from the exhaust pipe.

In the present invention, one end of the actuator is installed to the cross pipe, whereby a reaction force that is generated in the actuator can be supported by the cross pipe which has a high stiffness for constituting one part of the body frame. Therefore, any special reinforcement structure becomes unnecessary and an increase in weight can be restricted.

Also, the longitudinal direction of the actuator has been set so as to become substantially parallel with the center line of the chassis, whereby other auxiliary parts become easier to be arranged in a space around the actuator. Thus, the degrees of freedom in design such as shape and size of the auxiliary parts can be increased.

In the present invention, since the actuator, the hydraulic piping and the oil pump of the power steering system have been provided at a side opposite to a side on which the exhaust pipe extends from the front part of the engine with respect to the center line of chassis for extending in the back-and-forth direction of the vehicle body, the actuator, the hydraulic piping and the oil pump are kept apart from the exhaust pipe. Therefore, the actuator, the hydraulic piping and the oil pump are not easily affected by heat from the exhaust pipe. Thus, and heat countermeasures of the power steering system become unnecessary and the degrees of freedom in design of the power steering system, the engine, the exhaust pipe and the like can be increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, with reference to the accompanying drawings, the description will be made of the best mode for carrying out the invention.

Figure 1:
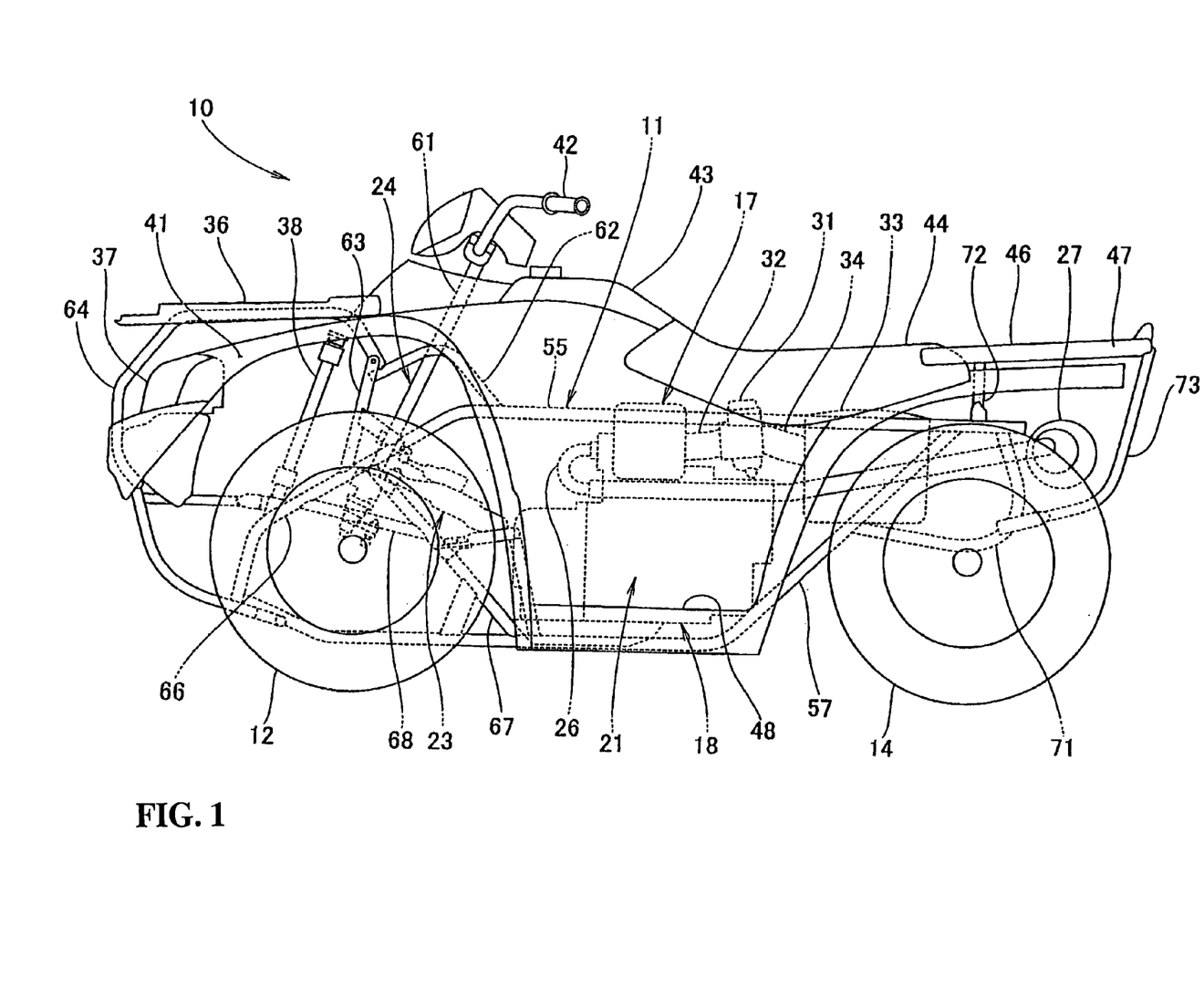
FIG. 1 is a side view showing a vehicle according to the present invention.

FIG. 1 is a side view of an uneven land driving vehicle 10, such as a four-wheel-drive vehicle, having a front part of the body frame 11 with front wheels 12, 13 having a broad width therebetween (only a reference numeral 12 on this side is shown) are installed via a suspension arm (not shown). In the rear of the body frame 11, rear wheels 14, 15 with a broad width therebetween are installed via a suspension arm (not shown). In the central part of the body frame 11, a power unit 21 consisting of an engine 17 and a transmission 18 is installed with the power unit 21 driving the front wheels 12, 13 and the rear wheels 14, 15 respectively.

The front wheels 12, 13 are steered by a steering system 24 to which a power steering system 23 has been attached.

The engine 17 has an exhaust piping 26 for extending from the front part thereof toward the rear. At the rear end of this exhaust pipe 26 a muffler 27 is connected.

A carburetor 31 is connected to the rear part of the engine 17 via an intake pipe 32 with an air cleaner 33 connected to the carburetor 31 via a connecting tube 34. A front carrier 36 is provided together with a head lamp 37, a radiator 38, a front fender 41, a handlebar 42, a fuel tank 43, a seat 44, a rear carrier 46, a rear fender 47 and a step 48.

The body frame 11 has left and right upper main frames 55, 56 (only the reference numeral 55 on this side is shown) for extending in a back-and-forth direction with lower main frames 57, 58 (only the reference numeral 57 on this side is shown) which are arranged below these upper main frames 55, 56 and are coupled to the front end and the rear end of the upper main frames 55, 56. Substantially L-character-shaped L-character frames 62, 62 (only the reference numeral 62 on this side is shown) and stand-up frames 63, 63 (only the reference numeral 63 on this side is shown) are installed to the front part of the upper main frame 55, 56 in order to support an intermediate part of the steering shaft 61 for constituting the steering system 24. Front frames 64, 64 (only the reference numeral 64 on this side is shown) are provided for supporting the front carrier 36.

The body frame 11 has inclined frames 67, 67 (only the reference numeral 67 on this side is shown) installed over between front inclined portions 66, 66 (only the reference numeral 66 on this side is shown) that are provided in the front parts of the upper main frames 55, 56 and the lower main frames 57, 58. Sub-inclined frames 68, 68 (only the reference numeral 68 on this side is shown) are provided for supporting the lower part of the steering system 24 by being installing over between these inclined frames 67, 67 and the front inclined portions 66, 66. Curvature frames 71, 71 are installed between each of rear ends of the upper main frames 55, 56 and each of the rear parts of the lower main frames 57, 58, respectively. Rear first frames 72, 72 (only the reference numeral 72 on this side is shown) are installed above the rear end portions of the upper main frames 55, 56 in order to support the rear carrier 46 with rear second frames 73, 73 (only the reference numeral 73 on this side is shown) being installed to the curvature frames 71, 71 in order to support the rear carrier 46.

Figure 2:
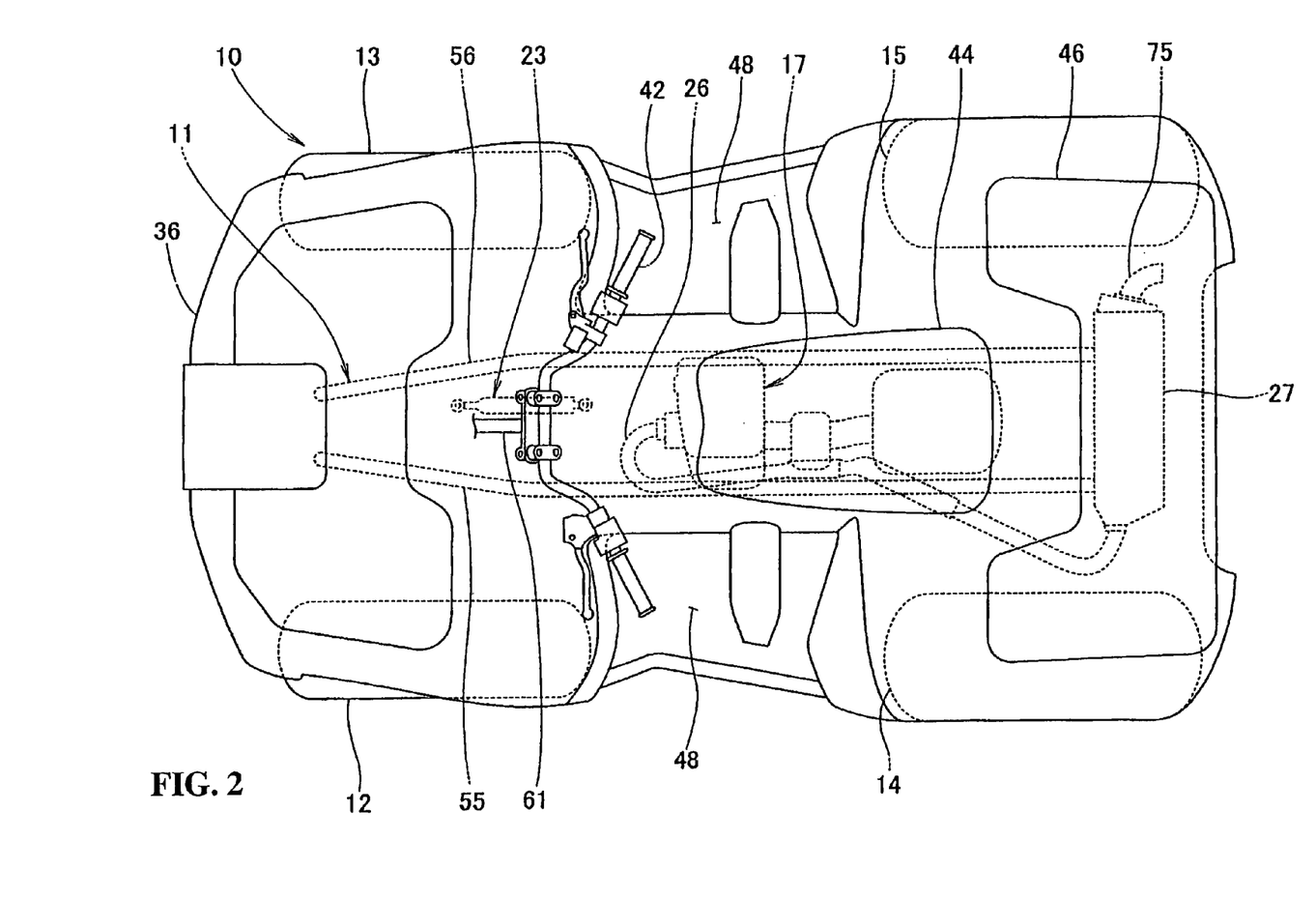
FIG. 2 is a plan view showing the vehicle according to the present invention.

FIG. 2 is a plan view showing a vehicle according to the present invention wherein a back-and-forth direction of an uneven land driving vehicle 10 includes, left and right upper main frames 55, 56 for constituting an extended body frame 11. Below the upper main frames 55, 56, there is arranged an engine 17 with an exhaust pipe 26 that is curved from the front part of the engine 17 to the left of the vehicle body and extending rearwardly and further extends backwardly obliquely to the left. In the rear part of the upper main frames 55, 56, the exhaust pipe 26 is connected to a muffler 27 that is arranged by extending in a direction of the vehicle width. Above the steering shaft 61 the handlebars 42 are installed. A tail pipe 75 is installed to the end portion of the muffler 27.

Figure 3:
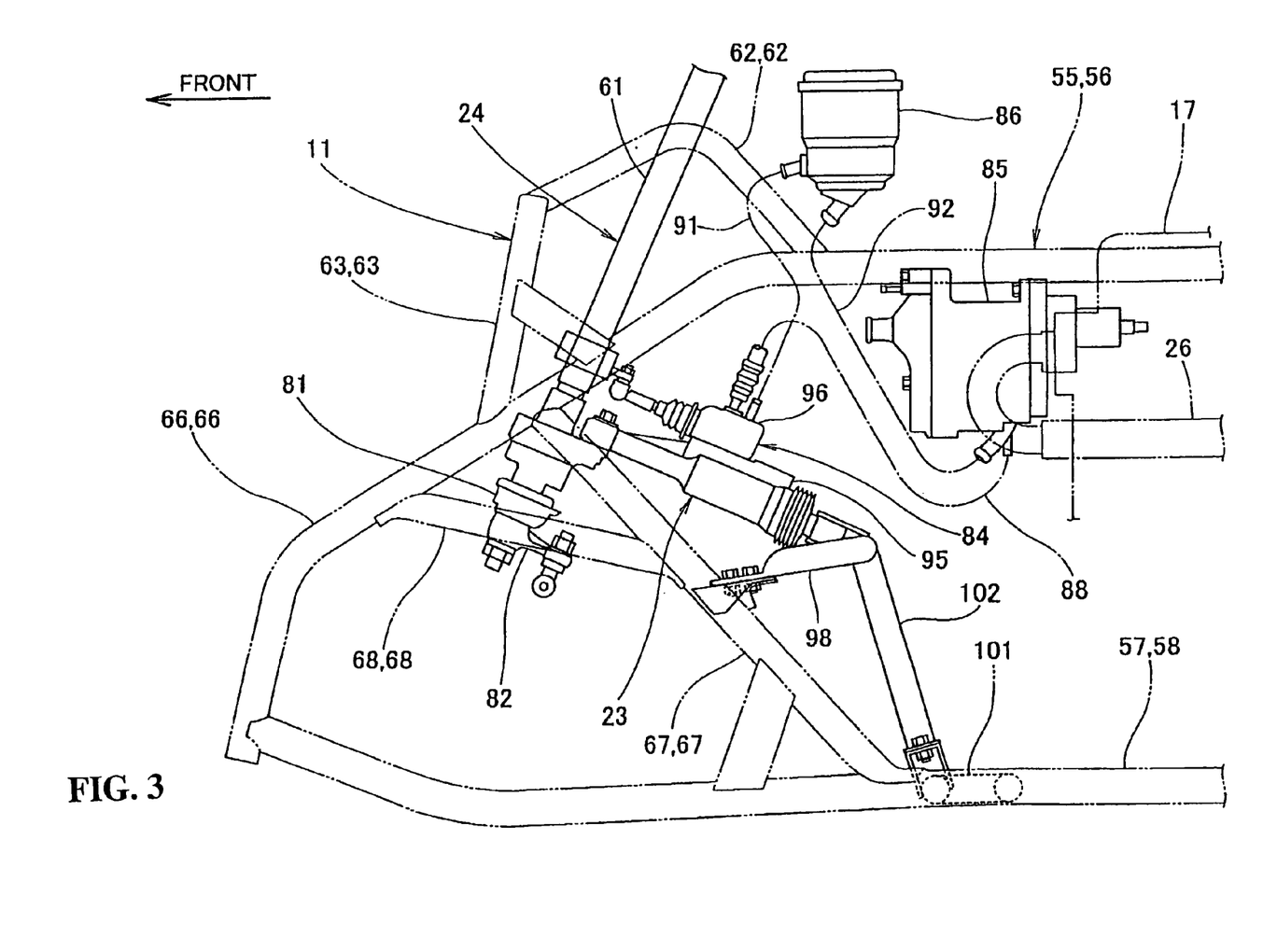
FIG. 3 is a side view showing a principal part of a front part of the vehicle according to the present invention.

FIG. 3 is a side view showing a principal part of the front part of a vehicle according to the present invention. A description of the steering system 24 and the power steering system 23 is set forth as follows. In this respect, an arrow (FRONT) in FIG. 3 represents the front part of the vehicle.

The steering system 24 is composed of the above-described handlebars 42 (See FIG. 1) and the steering shaft 61 with an upper part supporting portion (not shown) and a lower supporting portion 81 for installing this steering shaft 61 on the body frame 11 in such a manner so as to be freely rotatable. A steering arm 82 is installed to the lower end of the steering shaft 61.

The lower supporting portion 81 is a portion installed to the sub-inclined frames 68, 68 of the body frame 11.

The power steering system 23 is composed of an actuator 84 for imparting an assisting force to the steering shaft 61 by coupling the steering shaft 61 with an oil pump 85 that supplying hydraulic fluid to the actuator 84. A reservoir tank 86 for storing the hydraulic fluid is provided together with a feed hose 88 for supplying the hydraulic fluid from an oil pump 85 to the actuator 84. A return hose 91 is provided for returning the hydraulic fluid from the actuator 84 to the reservoir tank 86 with a suction hose 92 for conducting the hydraulic fluid within the reservoir tank 86 to the oil pump 85.

The actuator 84 is composed of cylinder portions 95 coupled to the steering shaft 61, respectively, and a spool valve portion 96 integrally installed to the upper parts of the cylinder portions 95.

With regard to the cylinder portion 95 of the actuator 84, the first cross pipe 98 is laid over between the inclined frames 67 and 67 and is installed and the end portion of the cylinder portion 95 is installed to this first cross pipe 98.

With regard to the first cross pipe 98, a supporting pipe 102 is installed to the second cross pipe 101 and is installed over and between the lower main frames 57 and 58. The first cross pipe 98 is a member installed to this supporting pipe 102.

Figure 4:
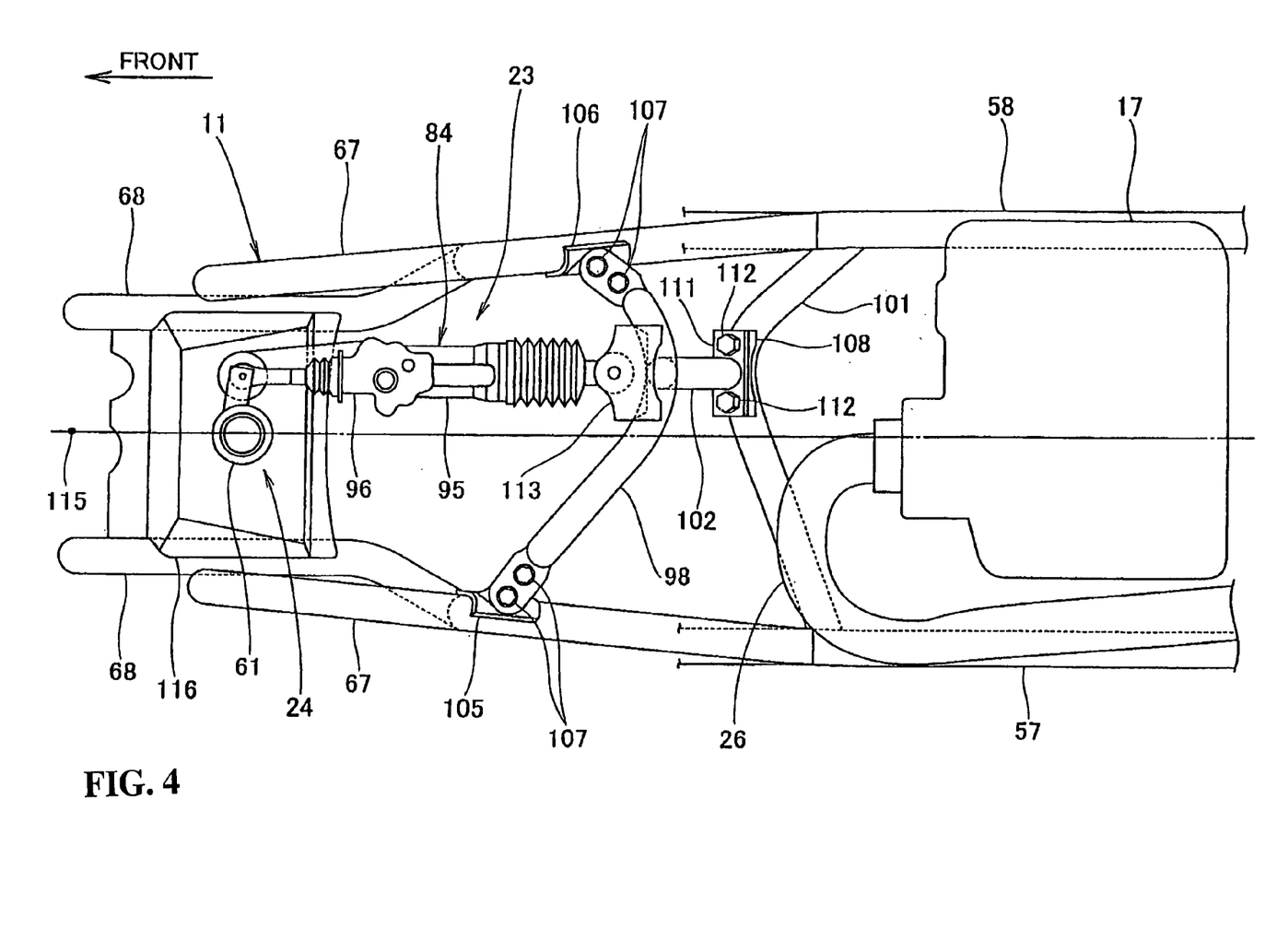
FIG. 4 is a plan view showing the principal part of the front part of the vehicle according to the present invention.

FIG. 4 is a plan view showing a principal part of the front part of a vehicle according to the present invention wherein to the inclined frames 67, 67 there are installed pipe installation brackets 105, 106, respectively. Between the pipe installation brackets 105 and 106, there is installed a first cross pipe 98 which is curved in a convex shape backwardly and at a lower part thereof the supporting pipe 102 is installed with bolts 107 . . . . To the second cross pipe 101, the pipe installation bracket 108 is installed and to the pipe installation bracket 108, a flange portion 111 is provided at the lower end of the supporting pipe 102 and is installed with bolts 112, 112. To the first cross pipe 98, there is installed the rear end of the cylinder portion 95 via the cylinder installation bracket 113 and the front end of the actuator 84 is coupled to the steering shaft 61, whereby the actuator 84 has been arranged on the right of the center line of chassis 115 extending in the back-and-forth direction of the vehicle and in parallel with the center line of chassis 115. The actuator 84 is arranged at a side (on the right of the body) opposite to a side on which the exhaust pipe 26 extends (on the left of the body) with respect to the center line of chassis 115. An installation bracket 116 is provided for installing the lower supporting portion 81 to the sub-inclined frames 68, 68. The oil pump 85, the feed hose 88, the return hose 91 and the suction hose 92 as the hydraulic piping as illustrated in FIG. 3 are also arranged at a side (the right of the body) opposite to a side (the left of the body) on which the exhaust pipe 26 extends with respect to the center line of chassis 115 in FIG. 4.

Further, the actuator 84 is arranged in parallel with the center line of the chassis 115, whereby the actuator 84 becomes substantially parallel with the inclined frames 67, 67 by plane sight. Thus, it becomes possible to form a larger space which can be effectively used, for example, between the actuator 84 and the left inclined frame 67. Therefore, it is easy to arrange auxiliary parts within this space.

Also, since tower-shaped frames are provided with three-point suspension, the first cross pipe 98 and the supporting pipe 102 have high stiffness and the actuator 84 is installed to such a frame, whereby a reaction force against an assisting force which is generated in the actuator 84 can be sufficiently supported by the tower-shaped frame.

Further, since the actuator 84 has been arranged at a side opposite to the exhaust pipe 26 with respect to the center line of chassis 115, the actuator 84 can be caused to recede from the exhaust pipe 26 and the thermal effects on, for example, the feed hose 88, the return hose 91 and the suction hose 92 can be restricted.

Figure 5:
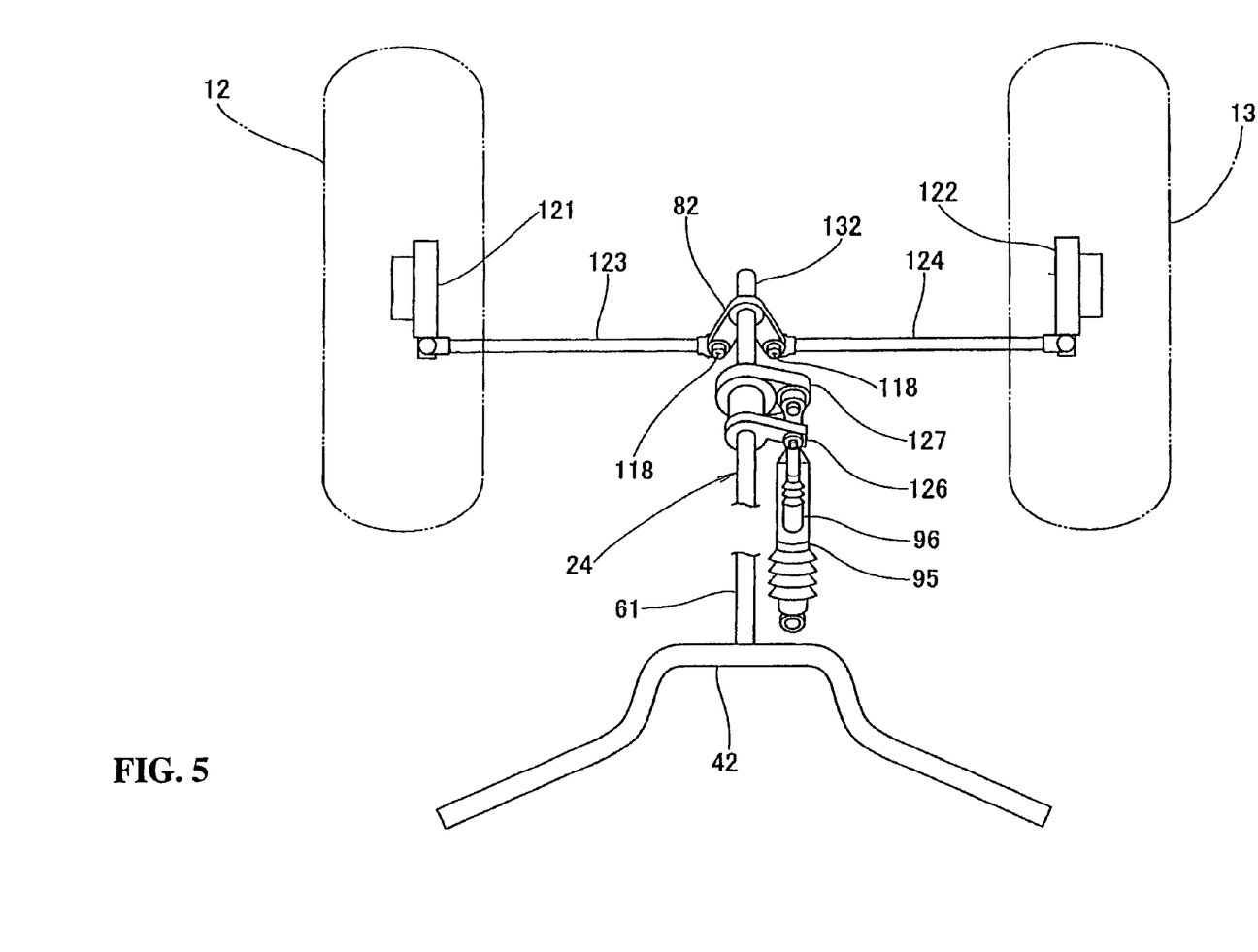
FIG. 5 is a plan view showing a steering system and a power steering system of the vehicle according to the present invention.

FIG. 5 is a plan view showing a steering system and a power steering system for a vehicle according to the present invention. The steering system 24 includes a steering arm 82 installed to the lower part of the steering shaft 61 with tie rods 123, 124 installed to two end portions of the steering arm 82 via spindles 118, 118, respectively, in such a manner so as to be freely swingable and installed to the rear portions of knuckles 121, 122 for supporting the front wheels 12, 13, respectively, in such a manner so as to be freely rotatable. The above-described handlebar 42 is installed to the upper part of the steering shaft 61 with an upper supporting portion (not shown) for supporting the upper part of the steering shaft 61 and a lower supporting portion 81 (See FIG. 3) for supporting the lower part of the steering shaft 61.

The steering shaft 61 is a member to which an upper arm 126 and a lower arm 127 have been installed. The tip of a spool valve portion 96 is coupled to the upper arm 126 while the tip of a cylinder portion 95 is coupled to the lower arm 127.

Figure 6:
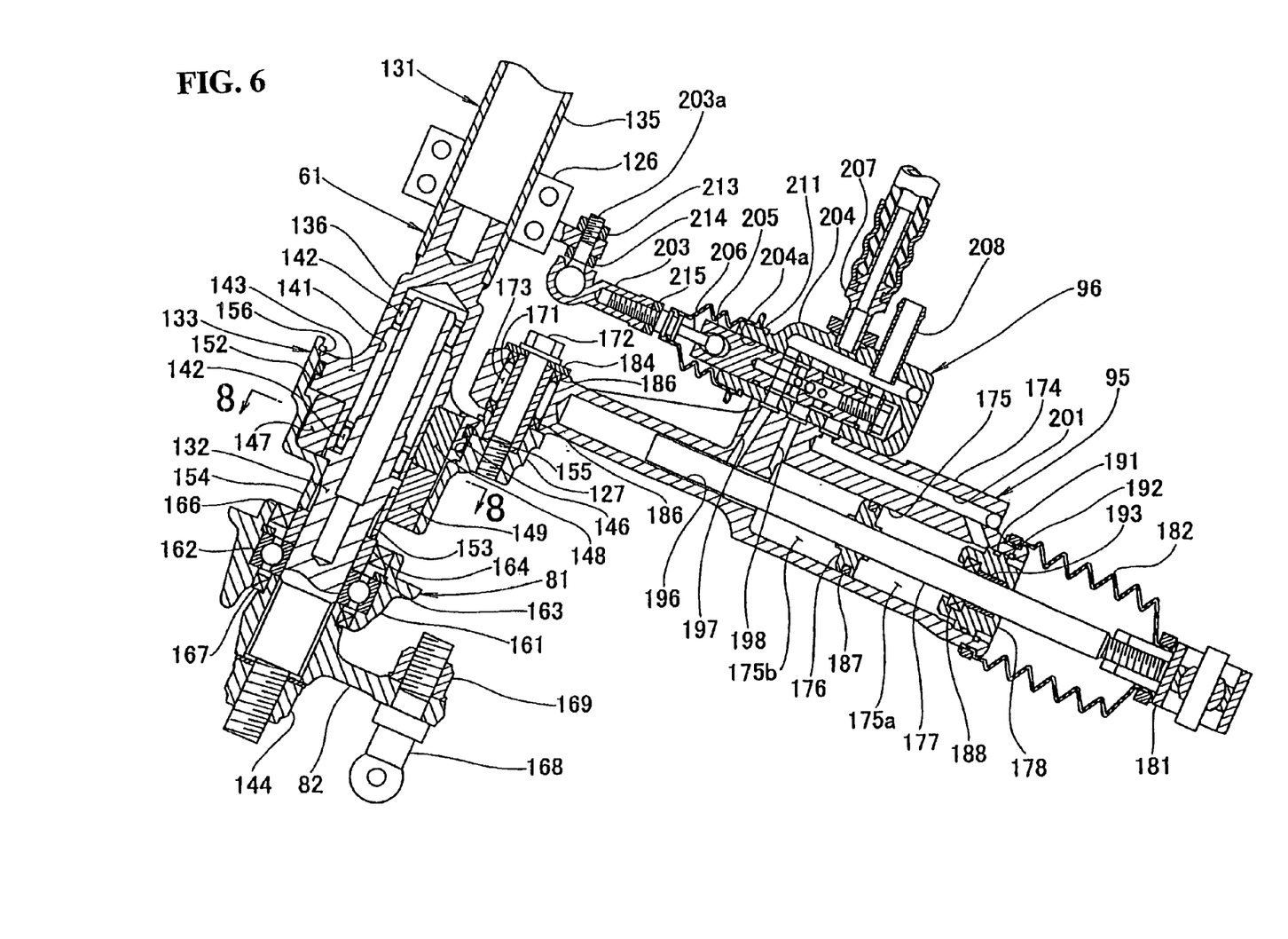
FIG. 6 is a cross-sectional view showing a principal part of the steering system and the power steering system of the vehicle according to the present invention.

FIG. 6 is a cross-sectional view showing a principal part of a steering system and a power steering system for a vehicle according to the present invention.

The steering shaft 61 includes an upper-side input shaft 131 with an output shaft 132 arranged below the input shaft 131. A booster mechanism 133 is interposed between the input shaft 131 and the output shaft 132 in order to transmit torque from the input shaft 131 to the output shaft 132.

The input shaft 131 includes a hollow upper shaft 135 and a lower shaft 136 installed to the lower part of this upper shaft 135.

The upper shaft 135 is a member to which the upper arm 126 for coupling to the spool valve portion 96 has been installed.

The lower shaft 136 is a member in which the output shaft 132 has been installed to the hollow portion 141 via needle bearings 142, 142 in such a manner as to be freely rotatable. The lower shaft 136 has a flange portion 143 in the lower part.

The output shaft 132 is a member which has been installed to the lower supporting portion 81 in such a manner so as to be freely rotatable. In the lower part thereof, the steering arm 82 is spline-coupled and is installed with a nut 144.

The booster mechanism 133 includes the above-described lower arm 127 formed with a hollow portion 146 with a C-shaped spring 147 arranged within the hollow portion 146. An input pin 148 is arranged likewise within the hollow portion 144 with one portion of which being sandwiched between a write-start portion and a write-end portion of the "C" character of the C-shaped spring 145. An output pin 149 is arranged below the input pin 148.

A spline-coupled portion 152 is obtained by spline-coupling a female spline provided on the inner surface of the hollow portion 146 and a male spline provided on a flange portion 143 of the lower shaft 136 with a slight clearance given for allowing both splines to perform relative rotations in a circumferential direction.

A serration-coupled portion 153 is obtained by coupling a female serration provided on a minor-diameter portion 154 to be provided below the hollow portion 146 to a male serration provided on the output shaft 132. An O-ring 155 is provided together with a snap ring 156 for preventing the lower shaft 136 from coming off from the lower arm 127.

The lower supporting portion 81 includes a supporting case 161 installed on the body frame side with a bearing 162 provided within the supporting case 161 in order to support the output shaft 132 in such a manner as to be freely rotatable. A snap ring 163 is provided for fixing the bearing 162 to the supporting case 161 with a collar 164 which is touched to an inner race of the bearing 162 and is fitted to the output shaft 132 in order to support the lower arm 127. A sealing member 166 is interposed between respective opening of the collar 163 and the supporting case 161 and a sealing member 167 is interposed between the supporting case 161 and the upper part of the steering arm 82.

The steering arm 82 is a bolt 168 with a ball constituting the ball joint for coupling to the tie rods 123, 124 (See FIG. 5) which has been fixed with a nut 169.

The cylinder portion 95 is obtained by installing a bolt 172 to the lower arm 127 via a collar 171 and is coupled to this bolt 172 via a needle bearing 173 in such a manner as to be freely swingable. The cylinder portion 95 includes a cylinder body 174 with a piston 176 inserted within a cylinder hole 175 of the cylinder body 174 in such a manner as to be freely movable. A piston rod 177 is installed relative to the piston 176 with a rod guide 178 for penetrating the piston rod 177 for guiding, and filling up an opening of the cylinder hole 175. A rod end 181 is screw-coupled to the tip of the piston rod 177 with rubber boots 182 installed over the rod end 181 and the end portion of the cylinder body 176.

A first oil chamber 175a and a second oil chamber 175b are formed within the cylinder hole 175 with a washer 184, sealing members 186, 186, a piston ring 187, a sealing member 188, an O-ring 191, a snap ring 192 for preventing the rod guide 178 from coming off and a bushing 193.

The cylinder body 174 has the above-described cylinder hole 175, a rod hole 196 formed in the interior of the cylinder hole 175 in order to cause the piston rod 177 to pass through, a first oil path 197 provided on the spool valve portion 96 side from this rod hole 196, a second oil path 198 provided on the spool valve portion 96 side from one end portion of the cylinder hole 175 and a third oil path 201 provided on the spool valve portion 96 side from the other end portion of the cylinder hole 175.

The spool valve portion 96 is obtained by coupling to the upper arm 126 via the ball joint 203 and includes the valve body 204, a spool valve 205 movably arranged within a valve hole 204a formed in this valve body 204a, a spool rod 206 installed to the end portion of the spool valve 205, an intake port 207 for guiding hydraulic fluid from the oil pump 85 (See FIG. 3) into the interior, a discharge port 208 for returning the hydraulic fluid to the reservoir tank 86 (See FIG. 3) and rubber boots 211 for filling up between the valve body 204 and the spool rod 206. A bolt 203a is provided with a ball for constituting the ball joint 203, a nut 213 for fixing the ball joint 203 to the upper arm 126, a spacer 214 and a lock nut 215 on screw-connecting the spool rod 206 to the ball joint 203.

Figure 7:
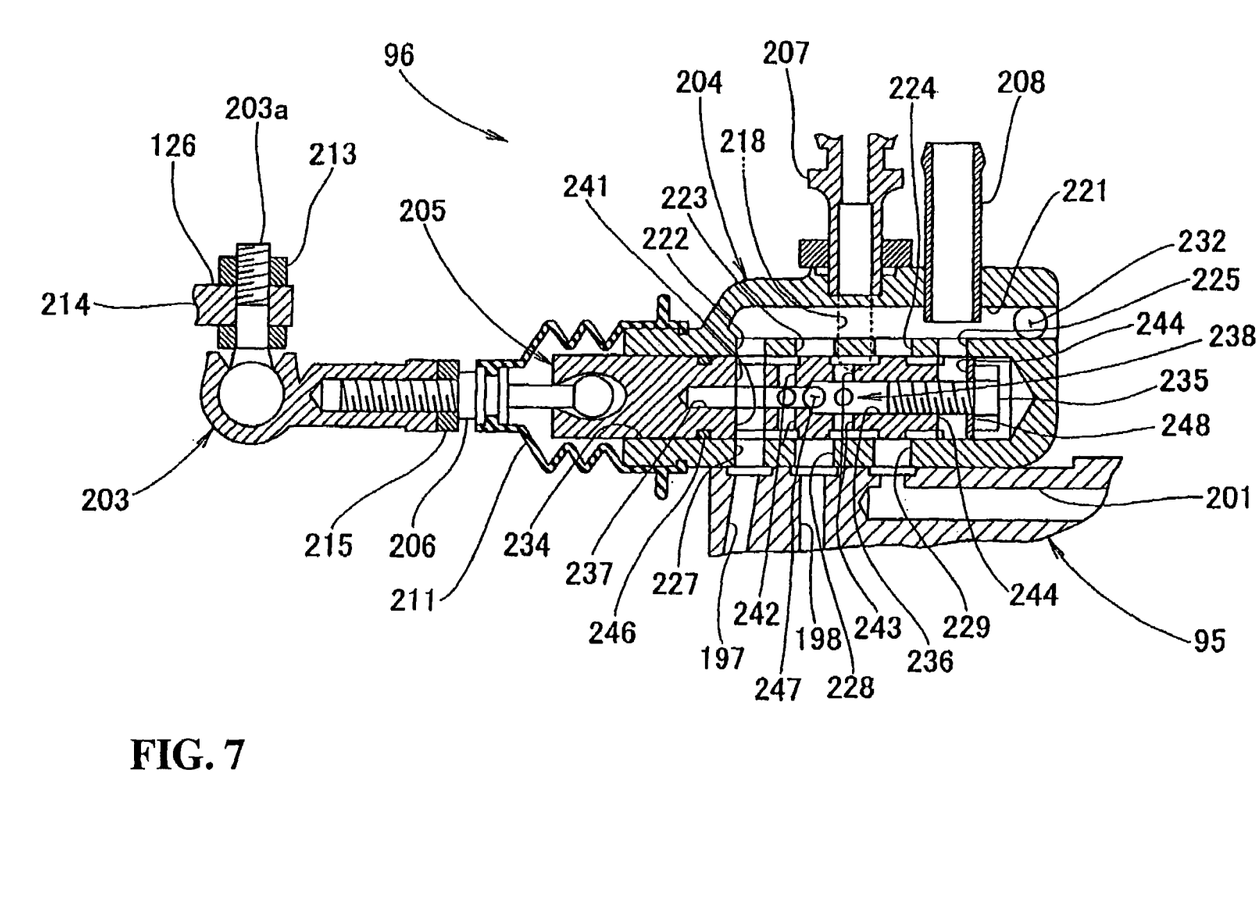
FIG. 7 is a cross-sectional view showing a spool valve portion of the power steering system in the vehicle according to the present invention.

FIG. 7 is a cross-sectional view showing a spool valve portion of the power steering system for a vehicle according to the present invention.

The valve body 204 of the spool valve portion 96 has an intake-side main oil path 218 for leading to the intake port 207 with a discharge-side main oil path 221 for leading to the discharge port 208. Body-side oil paths 222 to 225 are provided for leading to the discharge-side main oil path 221. Body-side oil paths 227 to 229 are provided for leading to each of a first oil path 197, a second oil path 198 and a third oil path 201 of the cylinder portion 95. A ball-shaped plug 232 is provided for filling up the end portion of the discharge-side main oil path 221.

The spool valve 205 is a member in which a valve center oil path 238 includes a major-diameter oil path 236 for filling up the end portion with a bolt 235 and a minor-diameter oil path 237 which has a smaller diameter than the major-diameter oil path 236 and is connected to the major-diameter oil path 236 is provided in the axial direction and has: valve-side first oil paths 241, 242 and valve-side second oil paths 242, 242 which lead to the minor-diameter oil path 237. Valve-side third oil paths 243, 243 are provided for leading to the major-diameter oil path 236 and valve-side fourth oil paths 244, 244 are provided at the end portion. An O-ring 246 is provided together with a ball as a valve body 247 for constituting a one-way valve provided on a joint between the major-diameter oil path 236 and the minor-diameter oil path 237 and a washer 248.

Next, the description will be made of an operation of the power steering system 23 described above.

Figure 8A:
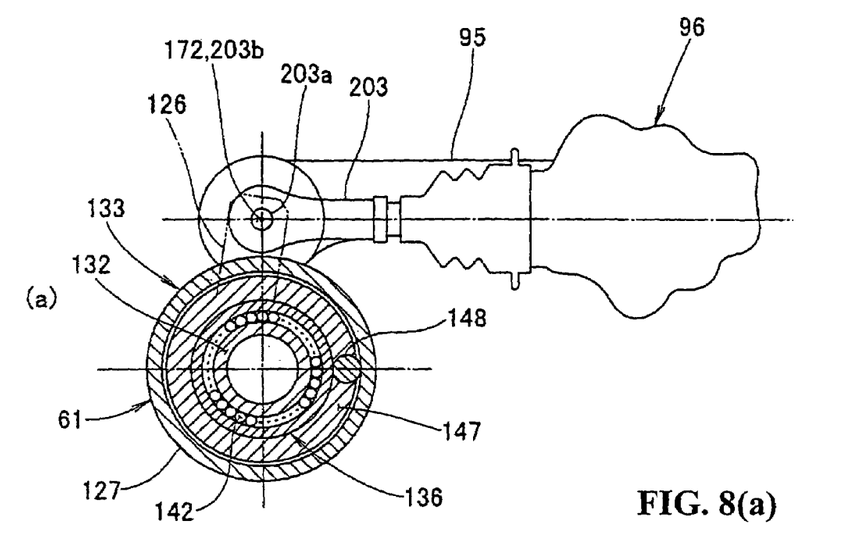
FIGS. 8(a) and 8(b) are first working views showing an operation of the power steering system for the vehicle according to the present invention.
Figure 8B:
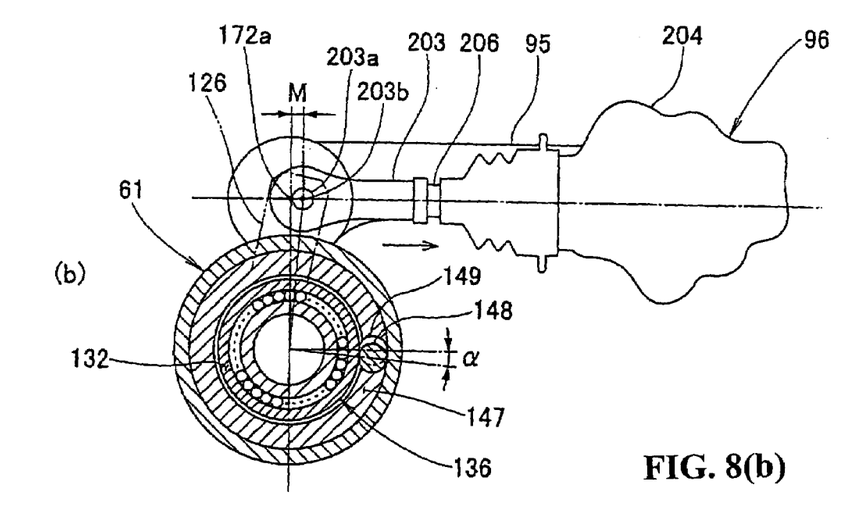

FIGS. 8(a) and 8(b) are first working views showing the operation of the power steering system for a vehicle according to the present invention.

FIG. 8(a) shows a state when the front wheels are facing toward the front of the vehicle before the power steering system 23 operates. FIG. 8(a) illustrates a cross section (corresponds to a cross-sectional view taken on line 8—8 of FIG. 6) of a booster mechanism 133 and a plan view for the spool valve portion 96.

An input pin 148 of the booster mechanism 133 is in a state sandwiched between each end portion of a C-shaped spring 147.

When the handlebars are steered, for example, to the right in FIG. 6, the steering shaft 61 rotates clockwise. Accordingly, that is, the lower shaft 136 of the input shaft 131 rotates clockwise in FIG. 8(b).

Thereby, the input pin 148 fitted to the lower shaft 136 rotates by an angle α clockwise. At this time, the lower arm 127 (See FIG. 6), the output pin 149 and the output shaft 132 do not rotate. This is because the spline-coupled portion 152 shown in FIG. 6 has been provided with a circumferential clearance. If the input pin 148 rotates by an amount corresponding to the clearance of the spline-coupled portion 152, both the input shaft 131 and the output shaft 132 start to rotate.

When the input pin 148 rotates by an angle α clockwise in FIG. 8(b), since the output pin 149 does not rotate, each end portion of the C-shaped spring 147 spreads so that an elastic force that is going to return the input pin 148 to the original state becomes greater. Also, since the upper arm 126 also rotates integrally with the input pin 148, the ball joint 203 coupled to the upper arm 126 and the spool rod 206 move, as indicated by an arrow, by a distance M toward the tip of the cylinder portion 95, that is, the bolt 172 (See FIG. 6) in an axial direction and towards the valve body 204 side. A point 172a indicates an axial center of the bolt 172 and a point 203b indicates an axial center of the bolt 203a with a ball of the ball joint 203.

Figure 9:
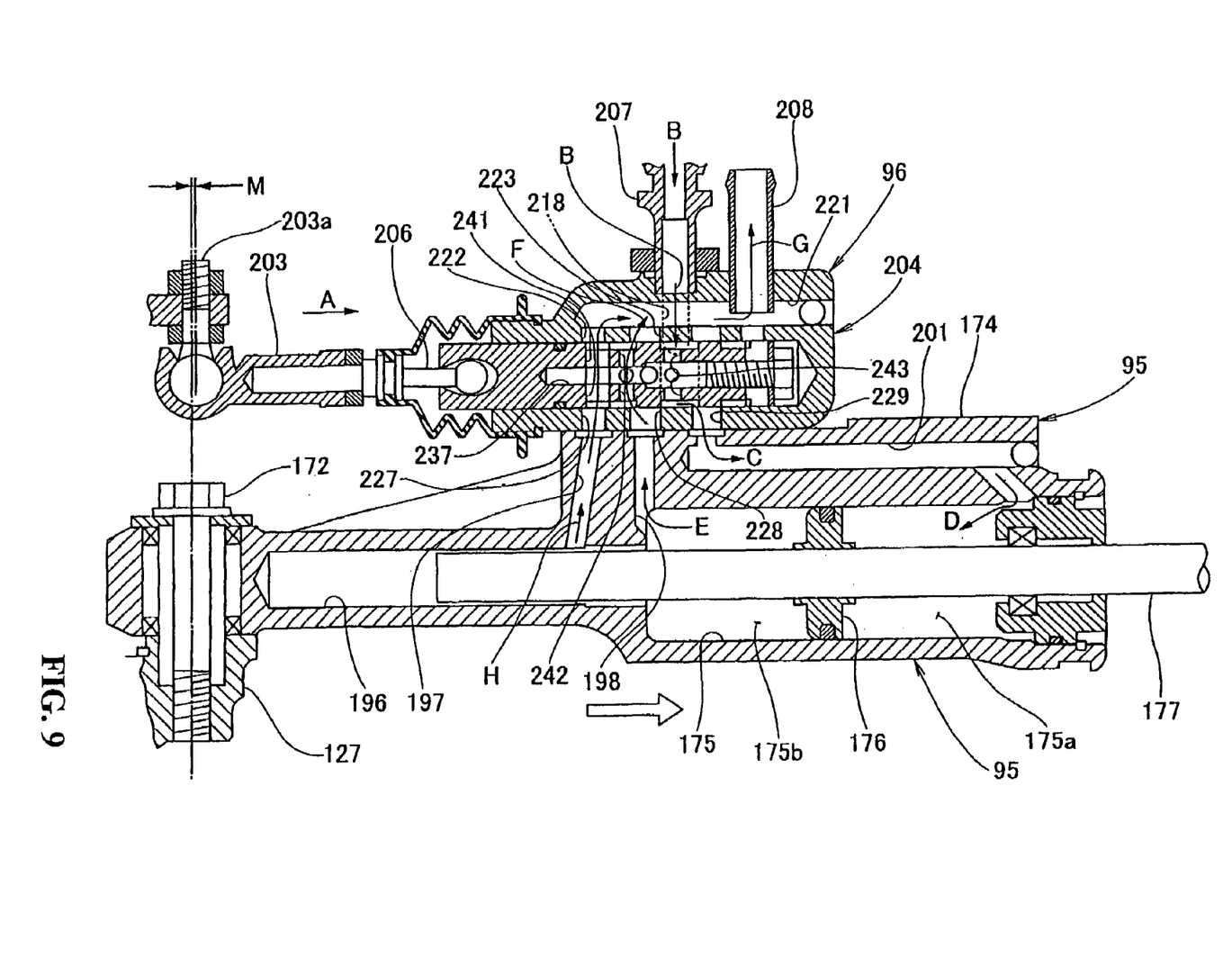
FIG. 9 is a second working view showing the operation of the power steering system for the vehicle according to the present invention.

FIG. 9 is a second working view showing an operation of the power steering system for a vehicle according to the present invention.

When the spool rod 206 moves by a distance M toward the valve body 204 as indicated by an arrow A, hydraulic fluid passes from the intake port 207 through the intake-side main oil path 218 as indicated by an arrow B, B; reaches the third oil path 201 of the cylinder body 174 through the valve-side third oil paths 243, 243 and the body-side oil path 229 as indicated by an arrow C and flows into the first oil chamber 175a from the third oil path 201 as indicated by an arrow D.

Also, the hydraulic fluid within the second oil chamber 175b passes, as indicated by an arrow E, through the second oil path 198 of the cylinder body 174 reaches, as indicated by an arrow F, the discharge-side main oil path 221 through the body-side oil path 228, the valve-side second oil path 242, the minor-diameter oil path 237, the valve-side second oil-path 242 and the body-side oil path 223 and returns, as indicated by an arrow G, to the reservoir tank from the discharge-side main oil path 221 through the discharge port 208.

Also, the hydraulic fluid within the rod hole 196 passes, as indicated by an arrow H, through the first oil path 197 of the cylinder body 174 reaches, as indicated by an arrow J, the discharge-side main oil path 221 through the body-side oil path 227, the valve-side first oil path 241, the minor-diameter oil path 237, the valve-side first oil path 241 and the body-side oil path 222 and returns to the reservoir tank from the discharge port 208.

Therefore, hydraulic fluid flows into the first oil chamber 175a of the cylinder hole 175, whereby the volume of the first oil chamber 175a increases. Since one end of the piston rod 177 has been installed to the first cross pipe 98 (See FIG. 3), the cylinder body 174 moves to the right as indicated by a hollow arrow toward the piston rod 177 and the piston 176 because the piston rod 177 and the piston 176 do not move in the axial direction at this time. Accordingly, the lower arm 127 installed to the cylinder body 174 also moves to the right and rotates the output shaft 132 clockwise in FIG. 5 to generate an assisting force.

Also, when the handlebars are steered to the left, the spool valve 205 moves to the left in FIG. 9 so as to leave the valve body 204 in FIG. 9. The spool rod 206 and the ball joint 203 also move integrally and a flow path for the hydraulic fluid within the spool valve portion 96 is switched. The hydraulic fluid flows into the second oil chamber 175b of the cylinder hole 175 and the hydraulic fluid flows out of the first oil chamber 175a with the hydraulic fluid flowing into the rod hole 196 and the cylinder body 174 moves in a direction opposite to the hollow arrow towards the piston rod 177 and the piston 176 to generate an assisting force.

As described in FIGS. 1, 3 and 4, according to a first aspect of the present invention, there is provided an uneven land driving wheel 10 in which front wheels 12, 13, see FIG. 2, are installed on the body frame 11 side in such a manner as to be freely steered and the front wheels 12, 13 are steered by a steering system 24 having a power steering system 23 supported by the body frame 11 wherein the power steering system 23 is provided with an actuator 84 for assisting the steering force with one end of this actuator 84 being installed to the first cross pipe 98 laid over the left and right of the body frame 11. Thus, an arrangement has been made such that the longitudinal direction of the actuator 84 becomes substantially parallel with the center line of chassis 115 extending in a back-and-forth direction of the body.

One end of the actuator 84 is installed to the first cross pipe 98, whereby a reaction force that is generated in the actuator 84 can be supported by the first cross pipe 98 having a high stiffness for constituting one part of the body frame 11. Therefore, any special reinforcement structure becomes unnecessary and an increase in weight can be restricted.

Also, the longitudinal direction of the actuator 84 has been set so as to become substantially parallel with the center line 115 of chassis, whereby other auxiliary parts become easier to be arranged in a space around the actuator 84 and the degrees of freedom in design such as shape and size of the auxiliary parts can be increased.

According to a second aspect of the present invention, there is provided an uneven land driving wheel 10 in which to the body frame 11, there is installed an engine 17. From the front part of this engine 17, the exhaust pipe 26 extends towards the rear of the vehicle body and the front wheels 12, 13, see FIG. 2, installed on the body frame 11 side are steered by the steering system 24 attached with the power steering system 23 wherein the power steering system 23 is provided with an actuator 84 for assisting the steering force. The actuator 84, the feed hose 88 as hydraulic piping, the return hose 91, the suction hose 92 and the oil pump 85 are provided at a side opposite to a side on which the exhaust pipe 26 extends from the front part of the engine 17 with respect to the center line 115 of chassis for extending in the back-and-forth direction of the vehicle body.

Since the actuator 84, the hydraulic piping 88, 91, 92 and the oil pump 85 of the power steering system 23 have been provided at a side opposite to a side on which the exhaust pipe 26 extends from the front part of the engine 17 with respect to the center line 115 of chassis for extending in the back-and-forth direction of the vehicle body, the actuator 84, the hydraulic piping such as the feed hose 88, the return hose 91 and the suction hose 92 and the oil pump 85 are separate from the exhaust pipe 26. Therefore, the actuator 84, the hydraulic piping 88, 91, 92 and the oil pump 85 become difficult to be affected by heat from the exhaust pipe 26. Accordingly, heat countermeasures of the power steering system 23 become unnecessary and the degrees of freedom in design of the power steering system 23, the engine 17, the exhaust pipe 26 and the like can be increased.

The layout structure of the power steering system for a vehicle according to the present invention is suitable for the saddle-ride type vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A layout structure of a power steering system for a vehicle in which front wheels are installed on a body frame side in such a manner as to be freely steered and said front wheels are steered by a power steering system supported by said body frame comprising:
    an actuator for assisting a steering force of said power steering system, one end of said actuator is installed to a cross pipe laid over a left and right body frame and a longitudinal direction of said actuator is substantially parallel with a center line of a chassis extending in a back-and-forth direction of said body frame.

2. The layout structure of a power steering system for a vehicle according to claim 1, wherein said actuator, hydraulic piping for said actuator and an oil pump for said actuator are provided on a side opposite to a side on which an exhaust pipe extends from a front part of an engine with respect to said center line of the chassis extending in a back-and-forth direction of said body frame.

3. The layout structure of a power steering system for a vehicle according to claim 1, wherein said actuator includes a cylinder portion coupled to a steering shaft and to a spool valve portion integrally installed to an upper part of the cylinder portion.

4. The layout structure of a power steering system for a vehicle according to claim 3, wherein said cylinder portion is disposed between an inclined frame and an end portion of the cylinder portion is mounted on the cross pipe.

5. The layout structure of a power steering system for a vehicle according to claim 1, wherein said left and right body frames are spaced a predetermined distance relative to each other and said actuator is disposed in close proximity to one of said left and right body frames for providing an enlarged space formed between said actuator and one of said right and left body frames.

6. The layout structure of a power steering system for a vehicle according to claim 1, and further including a second cross pipe extending between the left and right body frames and a supporting pipe extending between said cross pipe and said second cross pipe for supporting said actuator and for counteracting reaction forces therefrom.

7. The layout structure of a power steering system for a vehicle according to claim 3, and further including an upper arm and a lower arm mounted on the steering shaft with a tip of the cylinder portion being coupled to the lower arm and a tip of the spool valve portion being coupled to the upper arm.

8. A layout structure of a power steering system for use with a vehicle comprising:
    a body frame including a left frame member and a right frame member; and
    an actuator for assisting a steering force of a power steering system, one end of said actuator is installed to a cross pipe positioned between said left and right frame members and a longitudinal direction of said actuator is substantially parallel with a center line of the body frame extending in a longitudinal direction of the body frame.

9. The layout structure of a power steering system for use with a vehicle according to claim 8, wherein said actuator, hydraulic piping for said actuator and an oil pump for said actuator are provided on a side opposite to a side on which an exhaust pipe extends with respect to said center line of the body frame.

10. The layout structure of a power steering system for use with a vehicle according to claim 8, wherein said actuator includes a cylinder portion coupled to a steering shaft and to a spool valve portion integrally installed to an upper part of the cylinder portion.

11. The layout structure of a power steering system for use with a vehicle according to claim 10, wherein said cylinder portion is disposed between an inclined frame and an end portion of the cylinder portion is mounted on the cross pipe.

12. The layout structure of a power steering system for use with a vehicle according to claim 8, wherein said left and right body frames are spaced a predetermined distance relative to each other and said actuator is disposed in close proximity to one of said left and right body frames for providing an enlarged space formed between said actuator and one of said right and left body frames.

13. The layout structure of a power steering system for use with a vehicle according to claim 8, and further including a second cross pipe extending between the left and right body frames and a supporting pipe extending between said cross pipe and said second cross pipe for supporting said actuator and for counteracting reaction forces therefrom.

14. The layout structure of a power steering system for use with a vehicle according to claim 10, and further including an upper arm and a lower arm mounted on a the steering shaft with a tip of the cylinder portion being coupled to the lower arm and a tip of the spool valve portion being coupled to the upper arm.

15. A layout structure of a power steering system for use with a vehicle comprising:
    a body frame including a left frame member and a right frame member;
    a cross pipe mounted between said left frame member and said right frame member;
    front and rear wheels operatively connected to said body frame for providing mobility;
    a steering shaft operatively connected to at least one of said front and rear wheels for selectively steering said vehicle;
    a power steering system operatively connected to said steering shaft; and
    an actuator for assisting a steering force of said power steering system, one end of said actuator being mounted on said cross pipe and a distal end of said actuator is operatively connected to said steering shaft and is substantially parallel with a center line of the body frame extending in a longitudinal direction of the body frame.

16. The layout structure of a power steering system for use with a vehicle according to claim 15, wherein said actuator, hydraulic piping for said actuator and an oil pump for said actuator are provided on a side opposite to a side on which an exhaust pipe extends with respect to said center line of the body frame.

17. The layout structure of a power steering system for use with a vehicle according to claim 15, wherein said actuator includes a cylinder portion coupled to a steering shaft and to a spool valve portion integrally installed to an upper part of the cylinder portion.

18. The layout structure of a power steering system for use with a vehicle according to claim 17, wherein said cylinder portion is disposed between an inclined frame and an end portion of the cylinder portion is mounted on the cross pipe.

19. The layout structure of a power steering system for use with a vehicle according to claim 15, wherein said left and right body frames are spaced a predetermined distance relative to each other and said actuator is disposed in close proximity to one of said left and right body frames for providing an enlarged space formed between said actuator and one of said right and left body frames.

20. The layout structure of a power steering system for use with a vehicle according to claim 15, and further including a second cross pipe extending between the left and right body frames and a supporting pipe extending between said cross pipe and said second cross pipe for supporting said actuator and for counteracting reaction forces therefrom.

* * * * *